United States Patent
Bostick et al.

(10) Patent No.: US 10,306,011 B2
(45) Date of Patent: May 28, 2019

(54) DYNAMIC MODIFICATION OF IMAGE RESOLUTION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 15/420,671

(22) Filed: Jan. 31, 2017

(65) Prior Publication Data

US 2018/0218049 A1    Aug. 2, 2018

(51) Int. Cl.
| G06T 9/00 | (2006.01) |
| H04L 29/08 | (2006.01) |
| G06T 3/00 | (2006.01) |

(52) U.S. Cl.
CPC .......... H04L 67/306 (2013.01); G06T 3/0012 (2013.01)

(58) Field of Classification Search
None
See application file for complete search history.

(56) References Cited

U.S. PATENT DOCUMENTS

| 6,304,277 B1 * | 10/2001 | Hoekstra ................. G06T 11/60 345/600 |
| 7,397,961 B2 | 7/2008 | Keeney et al. |
| 8,019,182 B1 * | 9/2011 | Wolfram ................. G06T 11/60 345/698 |
| 8,340,411 B2 | 12/2012 | Fillion et al. |
| 8,379,055 B2 | 2/2013 | Lam et al. |
| 8,406,539 B2 | 3/2013 | Gering et al. |
| 8,525,112 B2 | 9/2013 | Zhou et al. |
| 8,660,358 B1 * | 2/2014 | Bergboer ........... G06K 9/00677 345/629 |
| 2012/0219210 A1 * | 8/2012 | Ding .................... G06K 9/4642 382/159 |
| 2014/0111431 A1 | 4/2014 | Horowitz |
| 2014/0160148 A1 | 6/2014 | Barkett et al. |

* cited by examiner

*Primary Examiner* — Gregory M Desire
(74) *Attorney, Agent, or Firm* — Christopher McLane; Andrew D. Wright; Roberts Mlotkowski Safran Cole & Calderon, P.C.

(57) ABSTRACT

Systems and methods for dynamic modification of image resolution are disclosed. In embodiments, a method comprises: identifying, by the computing device, one or more contextually relevant portions of a digital image based on user context data; creating, by the computing device, boundaries that define the one or more contextually relevant portions of the digital image; ranking, by the computing device, the one or more contextually relevant portions and one or more remaining portions of the digital image; and generating, by the computing device, an altered version of the digital image, wherein the altered version comprises one or more contextually relevant portions at a higher resolution than the one or more remaining portions.

20 Claims, 5 Drawing Sheets

DYNAMIC MODIFICATION OF IMAGE RESOLUTION

BACKGROUND

The present invention relates generally to image processing and, more particularly, to dynamic modification of image resolution.

The file size of an image is proportional to the pixel dimensions of the image measure by kilobytes (KB), megabytes (MB), etc. Images with more pixels can be used to produce more detail at a given displayed or printed size, but they require more memory (RAM) to load or to store (on hard disks, solid state drives, etc.), and may be slower to display, edit and print. Image resolution represents the detail to define the clarity of an image. For example, to load a high resolution image, more pixels need to be loaded; thus the image will take a longer time to load and will consume more bandwidth and data. Image resolution thus becomes a trade-off between image quality and file size in some environments.

Regarding image file size, several factors beyond pixel density affect viewing of the file. For example, the level of compression of an image file also has a big influence; the more a JPEG image is compressed the more "lossy" the image (the more detail is lost). The level of compression affects image sharpness, but also color palette, etc.

In various scenarios, mobile devices with wireless connectivity (i.e., smart phone, tablet, laptop, etc.), may not have enough data availability to view an image with higher quality (e.g., higher pixel density) or may need quicker loading of an image with better quality.

SUMMARY

In an aspect of the invention, a computer-implemented method for dynamic modification of image resolution includes: identifying, by the computing device, one or more contextually relevant portions of a digital image based on user context data; creating, by the computing device, boundaries that define the one or more contextually relevant portions of the digital image; ranking, by the computing device, the one or more contextually relevant portions and one or more remaining portions of the digital image; and generating, by the computing device, an altered version of the digital image, wherein the altered version comprises one or more contextually relevant portions at a higher resolution than the one or more remaining portions.

In another aspect of the invention, there is a computer program product for dynamic modification of image resolution. The computer program product comprises a computer readable storage medium having program instructions embodied therewith. The program instructions are executable by a computing device to cause the computing device to: obtain user profile data including context data; receive a request for content including a digital image; identify one or more contextually relevant portions of the digital image based on the context data; create boundaries that define the one or more contextually relevant portions of the digital image; and generate an altered version of the digital image, wherein the altered version comprises the one or more contextually relevant portions at a higher resolution than the one or more remaining portions.

In another aspect of the invention, there is a system for dynamic modification of image resolution. The system includes a CPU, a computer readable memory and a computer readable storage medium associated with a computing device. The system further includes program instructions to receive a request for content including a digital image; program instructions to identify one or more contextually relevant portions of the digital image based on user context data; program instructions to create boundaries that define the one or more contextually relevant portions of the digital image; and program instructions to generate an altered versions of the digital image, wherein the altered version comprises the one or more contextually relevant portions at a higher resolution than the one or more remaining portions, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
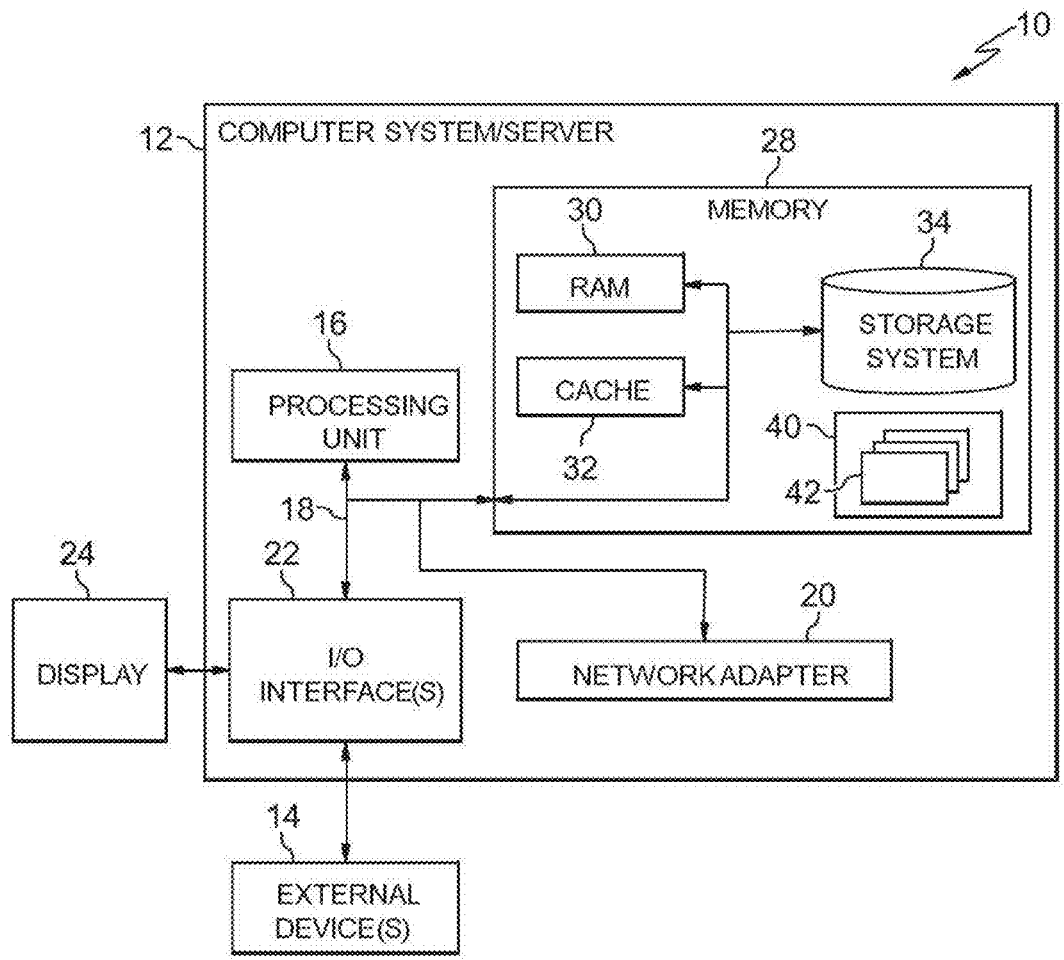
FIG. 1 depicts a computing infrastructure according to an embodiment of the present invention.

The present invention relates generally to image processing and, more particularly, to dynamic modification of image resolution. In embodiments, a method is provided to: determine the current context of content including images for a given user case; rank portions of the image's importance to a user to determine an appropriate image pixel density and compression level; and define boundaries of higher and lower resolution for display, with the objective of reducing the overall image file size and improving image loading time while maintaining quality of image portions most relevant to a user. A user's dynamic desire to view particular image portions may be predicted or identified based on search input, a user profile, user's likes and dislikes, relationship with different friends, current content being read (e.g., current readable content viewable by user), spoken interactions (e.g., voice commands), etc.

In embodiments, a system is provided that determines current context of an image that a user is requesting to view and ranks each portion within the image based on the user's interest. The user's interest may be determined from the user's anticipated usage of the image based on historical trends of the user's activity pertaining to each portion within the image. In embodiments, the system further determines the appropriate image pixel density and compression level for each portion and defines boundaries of higher or lower resolution areas for each portion. In embodiments, a system provides real-time contextual analysis, processing and display of a revised image having select portions of higher pixel density, in a manner that is transparent to a user and based on context, such that there is reduced data transmitted/used by an image viewing device and the processing time to display the revised image on the viewing device is reduced/optimized.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
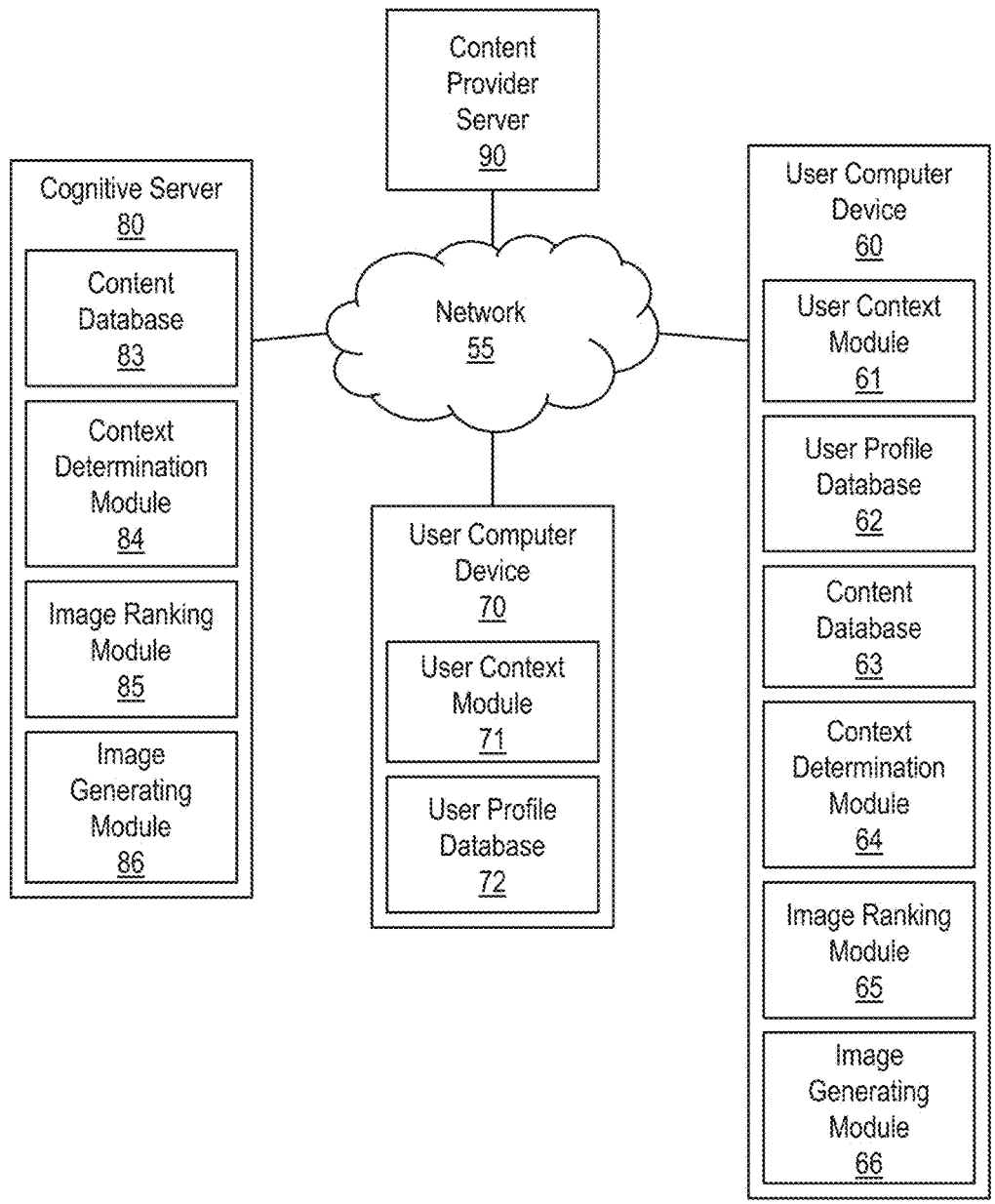
FIG. 2 shows an exemplary environment in accordance with aspects of the invention.

FIG. 2 shows an exemplary environment in accordance with aspects of the invention. In embodiments, methods of the invention are performed by a user computer device 60, which may be connected to a network 55. In alternative embodiments, methods of the present invention are performed by a user computer device 70 and a cognitive server 80 connected to the user computer device 70 through the network 55. The cognitive server 80 may also be connected to third party devices, such a content provider server 90.

The network 55 may be any suitable communication network or combination of networks, such as a local area network (LAN), a general wide area network (WAN), and/or a public network (e.g., the Internet). The user computer device 60 may be a general purpose computing device including the components of the computer system 12, such as a desktop computer, laptop computer, tablet computer, smartphone, etc. Alternatively, the user computer device 60 may be a special purpose computing device, such as a global positioning system (GPS) device in a vehicle, or the like. Likewise, the user computer device 70 may be a general purpose computing device including the components of the computer system 12, such as a desktop computer, laptop computer, tablet computer, smartphone, etc. Alternatively, the user computer device 70 may be a special purpose computing device, such as a mobile global positioning system (GPS) device, or the like.

In embodiments, the cognitive server 80 is a special purpose computing device including components of the computer device 12, which is adapted to provide image processing services to one or more computer devices (e.g., user computer device 70). In aspects, the cognitive server 80 is a cloud-based server providing image processing services to a plurality of users through the network 55.

Still referring to FIG. 2, a user context module 61, a context determination module 64, an image ranking module 65, and an image generating module 66 of the user computer device 60 are configured to perform one or more of the functions described herein. The user context module 61, the user context determination module 64, the image ranking module 65, and the image generating module 66 may include one or more program modules (e.g., program module 42 of FIG. 1) executed by the user computer device 60.

In embodiments, the user context module 61 is configured to gather user profile data, including personal context data and current context data, and save the user profile data in a user profile database 62. As used herein, the term personal context data refers to data providing information about a specific user's needs, desires and preferences. As used herein, the term current context data refers to data providing information about a user's current (immediate) needs, desires and preferences. In embodiments, the context determination module 64 is configured to identify one or more contextually relevant portions of a digital image retrieved from a content database 63, and create boundaries to define separate portions of the digital image. In embodiments, the image ranking module 65 is configured to rank each separate portion of the digital image based on context data of the user, wherein the ranking is associated with varying pixel densities and/or compression levels. In embodiments, the image generating module 66 is configured to generate an altered version of the digital image comprising one or more contextually relevant portions at a higher resolution than one or more remaining portions. In embodiments, the image generating module 66 is further configured to load and display the altered version of the digital image in response to a user's request for the digital image, wherein the file size of the altered version of the digital image is less than the file size of the original digital image.

Still referring to FIG. 2, a user context module 71 of the user computer device 70 is configured to perform similar functions to the user context module 61 of user computer device 60, and may include one or more program modules (e.g., program module 42 of FIG. 1) executed by the user computer device 70. More specifically, in embodiments, the user context module 71 is configured to gather user profile data, including personal context data and current context data, and save the user profile data in a user profile database 72.

Referring to the cognitive server 80 of FIG. 2, a context determination module 84, an image ranking module 85, and an image generating module 86 are configured to perform similar functions to the respective context determination module 64, image ranking module 65 and image generating module 66 of the user computer device 60, and may include one or more program modules (e.g., program module 42 of FIG. 1) executed by the cognitive server 80. More specifically, in embodiments, the context determination module 84 is configured to identify one or more contextually relevant portions of a digital image retrieved from a content database 83 or a third party source such as the content provider server 90. In embodiments, the context determination module 84 is further configured to create boundaries to define separate portions of the digital image. In embodiments, the image ranking module 85 is configured to rank each separate portion of the digital image based on context data of the user received from the user computer device 70. In aspects, the ranking is associated with varying pixel densities and/or compression levels. In embodiments, the image generating module 86 is configured to generate an altered version of the digital image comprising one or more contextually relevant portions at a higher resolution than one or more remaining portions. In embodiments, the image generating module 86 is further configured to load the altered version of the digital image in response to a user's request for the digital image (e.g., received from the user computer device 70 through the network 55), wherein the file size of the altered version of the digital image is less than the file size of the original digital image.

Figure 3:
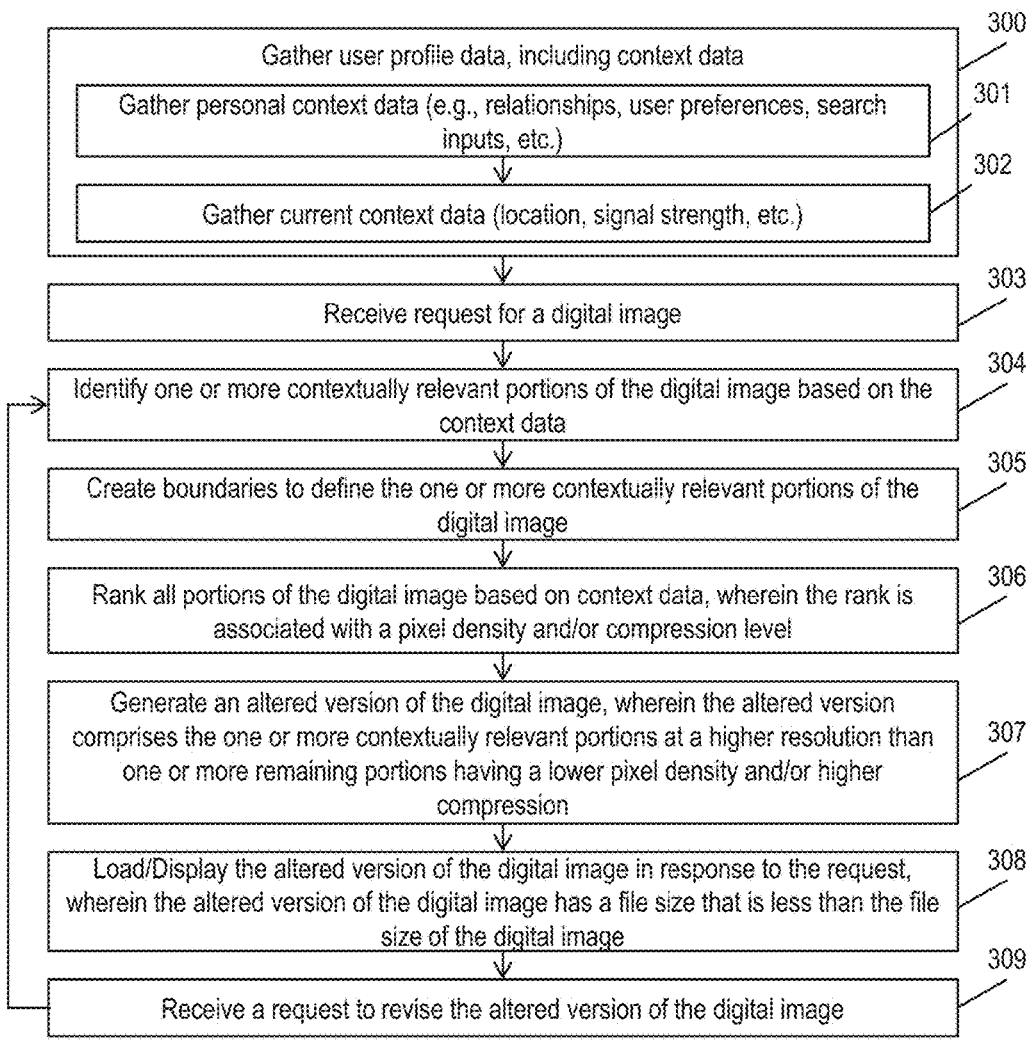
FIG. 3 shows a flowchart of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, user profile data, including context data, is gathered. In embodiments, the user context module 61 of the user computer device 60 gathers user profile data, including personal context data and current context data, for use by the context determination module 64. In embodiments, the user context module 71 of the user computer device 70 gathers user profile data, including personal context data and current context data, for use by the context determination module 84 of the cognitive server 80.

At sub step 301, personal context data is gathered. Sub step 301 may be implemented periodically, or on an ongoing basis. In embodiments, software installed on the user computer device (e.g., 60 or 70) gathers personal context data based on search input, user profile information (e.g., user ID), user's likes and dislikes, relationship information (e.g., friends, friends of friends, family, coworkers), recent content read by user (e.g., books, news articles, emails, text posted for a given image, etc.) and the like. The personal context data may be gathered, in part, directly from a user, such as through a questionnaire or user registration screen.

At sub step 302, current context data is gathered. Sub step 302 may be implemented periodically, or in response to a user requesting a digital image at step 303. Current context data may be determined from user preferences, user profile data, recent activity (i.e., reading email), etc. In embodiments, software installed on the user computer device (e.g., 60 or 70) gathers current context data, such as location data (e.g., current location, future destination) and user computer device status (e.g., low Wi-Fi signal, low data availability). By way of example, current context data gathered from a user computer device (60, 70) may enable the present system to identify where a user is and where a user is going. Further, current context data may enable the present system to identify that the user has plans to stay at a particular hotel based on the user's hotel reservations, thus recognizing that it is desirable for the user to view at least an image area immediately surrounding a hotel image at higher resolution then other image areas in accordance with methods of the invention.

At step 303, a request for a digital image is received from a user. The digital image may be any image within requested content, such as any digital image within web pages, applications, etc. Examples of digital images include maps, photographs on social networking sites, etc. In embodiments, the user computer device 60 receives a request for an image (e.g., content from the content database 63 including an image) through a user input device (e.g., touchscreen, voice command module). By way of example, the user computer device 60 may be a mobile GPS device and a user may request a digital image of a map by verbally requesting the map. In alternative embodiments, the cognitive server 80 receives a request for an image (e.g., any content including an image from the content database 83 or the content provider server 90) from the user computer device 70 through the network 55. By way of example, the user computer device 70 may be a smartphone and a user of the smartphone may request a digital image by conducting an internet searching for images of a group of people. In embodiments where the cognitive server 80 is remote from a user, the cognitive server 80 may provide dynamic image processing as a service to the user.

At step 304, one or more contextually relevant portions of the digital image are identified based on context data of the user. In embodiments, the context determination module 64 of the user computer device 60 identifies one or more contextually relevant portions of a digital image from the content database 63 based on context data from the user profile database 62. In alternative embodiments, the context determination module 84 of the cognitive server 80 identifies one or more contextually relevant portion of a digital image from the content database 83 or the content provider server 90. As used herein the term contextually relevant portion refers to a portion of a digital image that has contextual similarity (i.e. correlates) to personal context data and/or current context data. By way of example, the user computer device 60 may be a mobile GPS device, and the context determination module 64 may identify a highlighted navigation route between a starting location and a destination as a contextually relevant portion of the digital image (map) based on user context data from the user profile database 62 indicating that the user is driving on the navigation route. By way of another example, the user computer device 70 may be a smartphone, and the context determination module 84 may identify certain people in an image as being relevant to the user (e.g., friends, family, or coworkers of the user) based on context data of the user received from the user profile database 72 of the user computer device 70. Various image processing software packages (e.g., image recognition software) and methods can be utilized with the present invention to implement step 304.

In step 305, boundaries to define the one or more contextually relevant portions of the digital image are created. In embodiments, the context determination module (64 or 84) creates boundaries in the digital image to define the one or more contextually relevant portions identified at step 304. In aspects, image processing software is utilized to define separate portions of the digital image with the boundaries, wherein each separate portion can be separately downloaded in time, but is grouped or associated with the remaining portions of the digital image. In aspects, a contextual boundary is identified based on object recognition and contextual relationships of the recognized objects with user context data. By way of example, if the current context is "user is looking at sunset photographs", travel related photographs, etc., the context determination module (64 or 84) recognizes that the user is looking for points of interest and will select boundaries accordingly.

At step 306, all portions of the digital image are ranked based on context data, wherein the rank is associated with various pixel densities and/or compression levels. In embodiments, the image ranking module 65 of the user computer device 60 ranks the portions of the digital image. In alternative embodiments, the image ranking module 85 of the cognitive server 80 ranks the portions of the digital image. In embodiments, software will cause the image ranking module (65 or 85) to rank image portions having contextual similarity to user context data, and accordingly effective boundaries will be created wherein high pixel density will be displayed. For example, portions of the image may be ranked by the image ranking module (65 or 85) as being very relevant, somewhat relevant, and least relevant, wherein the very relevant portions have the highest pixel density, the somewhat relevant portions have a lower pixel density or are compressed, and the least relevant portions have the lowest pixel density or are the most compressed. This results in the very relevant portions being delivered to a user at a higher resolution than the somewhat relevant and least relevant portions of the image.

At step 307, an altered version of the digital image is generated, wherein the altered version comprises one or more contextually relevant portions at a higher resolution than one or more remaining portions having a lower pixel density and/or higher compression. In embodiments, the image generating module 66 of the user computer device 60 generates the altered digital image. In alternative embodiments, the image generating module 86 of the cognitive server 80 generates the altered digital image. In aspects, an altered version of the digital image is generated wherein software of a user device (e.g., 60, 70) will show high pixel density around a contextual area (e.g., point of interest), a highly viewed image portion, or the like.

At step 308, the altered version of the digital image is loaded in response to the request received at step 303. In embodiments, the image generating module 66 of the user computer device 60 loads the altered version of the digital image for display by a display (e.g., 24) of the user computer device 60, based on the user's request (e.g., selecting a picture to view) at step 303. In alternative embodiments, the image generating module 86 of the cognitive server 80 loads the altered version of the digital image for display by a display (e.g., 24) of the user computer device 70, based on the request received by the user computer device 70 at step 303. In aspects, once an altered version of the digital image is ready to be loaded (e.g., a web page), software of the image generating module (66 or 86) gathers the image portion area where high pixel density has to be displayed, and then loads the altered version of the digital image.

At step 309, a request may be received from a user to revise the altered version of the digital image, and the method returns to step 304. In aspects, at any point in time, a user can define one or more areas in an image, and pixel density can be managed in the displayed image. For example, the altered version of the digital image may be a map, and a user of the user computer device 60 may select a portion of the map to view at a higher resolution. Based on this example, and in response to the request received at step 309, the user computer device 60 identifies that the portion of the map is a contextually relevant portion of the revised digital image based on the request (i.e., context data indicating that the user wishes to see the portion more clearly) in accordance with step 304, creates boundaries to define the user selected portion in accordance with step 305, ranks all portions of the digital image in accordance with step 306, generates a second alternative version of the digital image in accordance with step 307, and loads the revised or second alternative version of the digital image in accordance with step 308. Steps 304-309 may be repeated any number of times.

Figure 4:
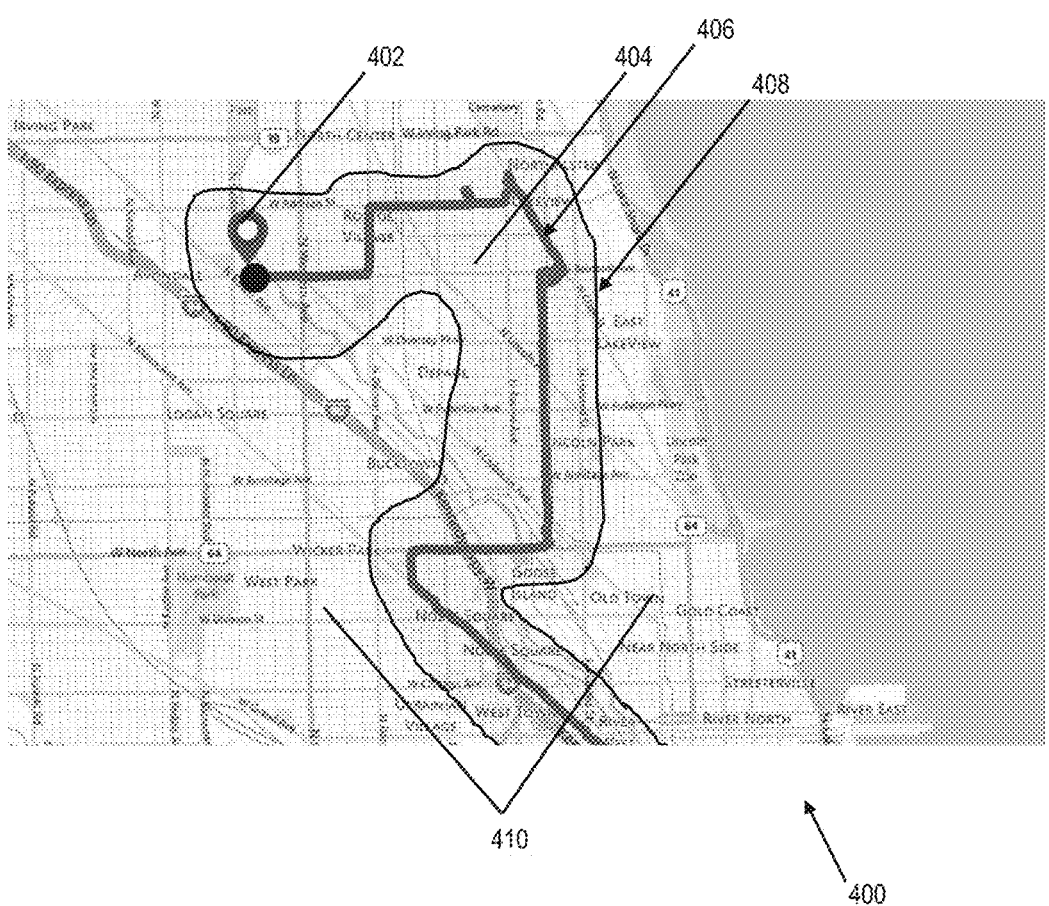
FIG. 4 depicts an exemplary scenario in accordance with aspects of the invention.

FIG. 4 depicts an exemplary scenario according to aspects of the invention, wherein a digital map 400 is requested by a user in accordance with step 303 of FIG. 3. In this scenario, the computer device 60 includes electronic mapping software, and a user requests the map 400 utilizing a user interface of user computer device 60. In accordance with step 304 of FIG. 3, the content determination module 64 recognizes that the context data gathered in accordance with step 300 indicates that the user has requested the map, and that the user is driving from a first destination (not shown) to a final destination indicated at 402. Based on this context data, the content determination module 64 identifies that the contextually relevant portion 404 of the digital map 400 is the portion of the map 400 within a predetermined distance from the driving route 406. In accordance with step 305 of FIG. 3, the content determination module 64 creates a boundary 408 to define the contextually relevant portion 404. The image ranking module 65 then ranks all portions of the digital map 400 in accordance with step 306 of FIG. 3, including the contextually relevant portion 404 and the remaining portions indicated at 410. In this scenario, the image ranking module 65 ranks the contextually relevant portion 404 higher than the remaining portions 410, and generates an altered version of the digital map 400 (not shown), in which the contextually relevant portion 404 has a higher pixel density than the remaining portions 410.

Figure 5:
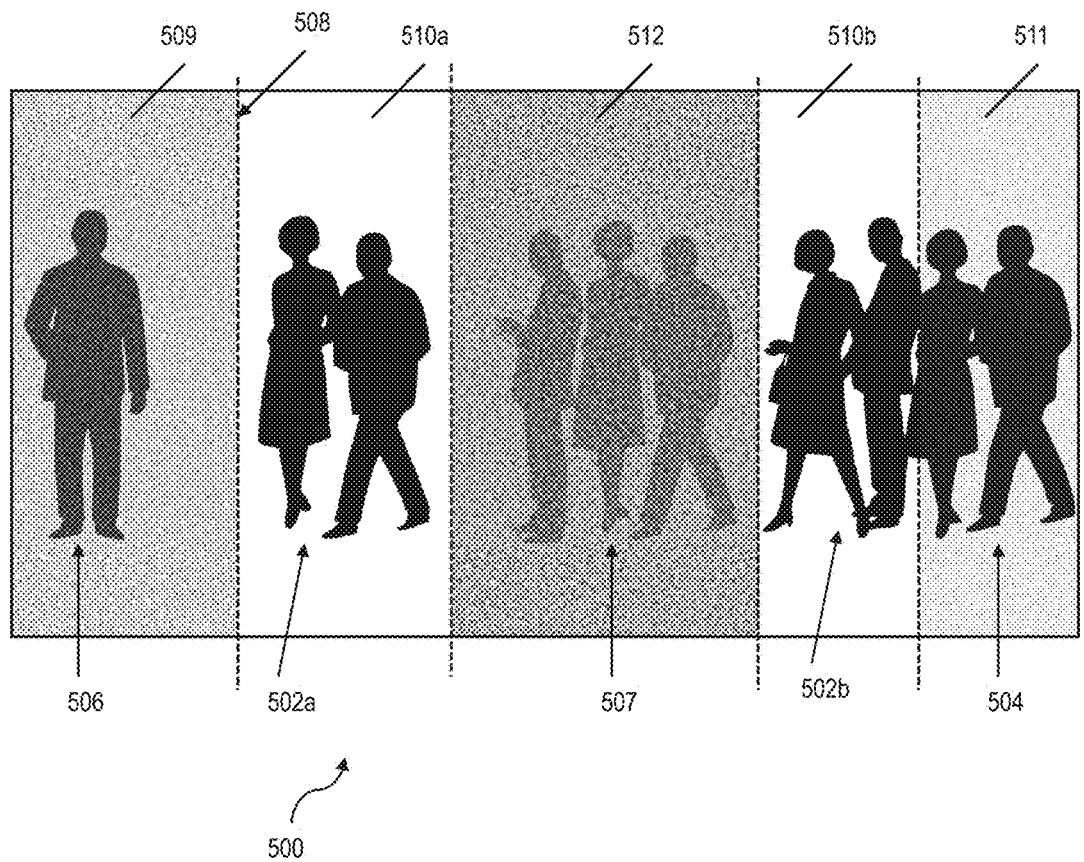
FIG. 5 depicts a second illustrative scenario in accordance with aspects of the invention.

FIG. 5 depicts a second illustrative scenario in accordance with aspects of the invention, wherein a user requests a photograph (an altered version of which is represented at 500). In this embodiment, a user of user computer device 70 requests a photograph from the cognitive server 80 when the computer device 70 has limited network connectivity, in accordance with step 303 of FIG. 3. The context determination module 84 determines from user context data that the user has certain friends, acquaintances, and coworkers, and identifies friends 502a, 502b, acquaintances 504, and a coworker 506 of the user in the photograph in accordance with step 304 of FIG. 3. User context data gathered in accordance with step 300, indicates that the user prefers to see friends first, acquaintances second, coworkers third, and all remaining or unidentified parties 507 fourth. Current context data gathered in accordance with step 302 indicates that the user computer device 70 has limited network connectivity, and thus should limit any image to a predetermined file size. The context determination module 84 creates boundaries 508 to define the contextually relevant portions 509, 510a, 510b, and 511 containing the user's friends, acquaintances, and coworker, in accordance with step 305 of FIG. 3. While the boundaries 508 are shown as straight lines, it should be understood that the boundaries 508 can be any shape to define contextually relevant portions of an image. The image ranking module 85 ranks all portions of the photograph 500, including the contextually relevant portions 509, 510a, 510b and 511, as well as the remaining portion 512, in accordance with step 306 of FIG. 3. In this scenario, the ranking module 85 ranks the contextually relevant portions 510a, 510b including friends 502a, 502b as highest priority, the contextually relevant portion 511 including acquaintances 504 as the second highest priority, the contextually relevant portion 509 including the coworker 506 as a third highest priority, and the remaining portion 512 as the fourth highest priority. The image generating module 86 generates the altered version of the digital image 500, wherein the altered version comprises contextually relevant portions 509, 510a, 510b, and 511 having a higher resolution than the remaining portion 512 (step 307 of FIG. 3). Moreover, the contextually relevant portions 510a, 510b including friends 502a, 502b, have the highest pixel density, the contextually relevant portion 511 including acquaintances 504 has a middle pixel density, the contextually relevant portion 509 including the coworker 506 has a low pixel density, and the remaining portion 512 including unknown parties 507 has the lowest pixel density. In this way, a photograph 500 delivered to a user in accordance with step 308 of FIG. 3 has a smaller file size than the original file size, while maintaining clarity of subject matter likely to be (predicted to be) important to the user.

Advantageously, embodiments of the invention enable a computing device to dynamically identify contextually important areas in an image and load the contextually important areas at a higher pixel density than remaining parts of an image, based on an available mobile data plan and predicted time requirement to load the image. In aspects, the invention provides mechanisms to change pixel density through the use of a composite image and the ability to resize a color scheme.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any consumer who wishes to view digital images. In return, the service provider can receive payment from the customer(s) under a subscription and/or fee agreement and/or the service provider can receive payment from the sale of advertising content to one or more third parties.

In still another embodiment, the invention provides a computer-implemented method for dynamically modifying image resolution. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamic modification of image resolution, comprising:
   identifying, by the computing device, one or more contextually relevant portions of a digital image based on context data of a user;
   creating, by the computing device, boundaries that define the one or more contextually relevant portions of the digital image;
   ranking, by the computing device, the one or more contextually relevant portions and one or more remaining portions of the digital image; and
   generating, by the computing device, an altered version of the digital image, wherein the altered version comprises one or more contextually relevant portions at a higher resolution than the one or more remaining portions.

2. The method of claim 1, further comprising obtaining, by the computing device, user profile data including the context data of the user.

3. The method of claim 1, further comprising receiving, by the computing device, a request for the digital image.

4. The method of claim 1, further comprising loading, by the computing device, the altered version of the digital image for viewing by the user.

5. The method of claim 1, further comprising receiving, by the computing device, a request to revise the altered version of the digital image.

6. The method of claim 5, further comprising:
identifying, by the computing device, one or more contextually relevant portions of the altered digital image based on the request to revise the altered version of the digital image;
creating, by the computing device, boundaries to define the one or more contextually relevant portions of the altered version of the digital image;
ranking, by the computing device, the one or more contextually relevant portions and one or more remaining portions of the altered version of the digital image; and
generating, by the computing device, a revised altered version of the digital image, wherein the revised altered version of the digital image comprises the one or more contextually relevant portions at a higher resolution than the one or more remaining portions.

7. The method of claim 1, wherein the altered version of the digital image has a file size that is less than the file size of the digital image.

8. The method of claim 1, wherein the context data of the user includes personal context data and current context data.

9. A computer program product for dynamic modification of image resolution, the computer program product comprising a computer readable storage medium having program instructions embodied therewith, the program instructions executable by a computing device to cause the computing device to:
obtain user profile data including context data;
receive a request for content including a digital image;
identify one or more contextually relevant portions of the digital image based on the context data;
create boundaries that define the one or more contextually relevant portions of the digital image; and
generate an altered version of the digital image, wherein the altered version comprises the one or more contextually relevant portions at a higher resolution than the one or more remaining portions.

10. The computer program product of claim 9, wherein the context data is context data of a user and the program instructions further cause the computing device to load the altered version of the digital image for viewing by the user.

11. The computer program product of claim 9, wherein the context data includes personal context data and current context data.

12. The computer program product of claim 11, wherein:
the personal context data comprises at least one selected from the group consisting of: user relationship data, user preference data, search input data, and current content displayed to the user; and
the current context data comprises at least one selected from the group consisting of: location data, destination data, and computing device status data.

13. The computer program product of claim 9, wherein the program instructions further cause the computing device to:
receive a request to revise the altered version of the digital image;
identify one or more contextually relevant portions of the altered digital image based on the request to revise the altered version of the digital image;
create boundaries that define the one or more contextually relevant portions of the altered version of the digital image;
rank the one or more contextually relevant portions and one or more remaining portions of the altered version of the digital image; and
generate a revised altered version of the digital image, wherein the revised altered version of the digital image comprises the one or more contextually relevant portions at a higher resolution than the one or more remaining portions.

14. A system for dynamic modification of image resolution, comprising:
a CPU, a computer readable memory and a computer readable storage medium associated with a computing device;
program instructions to receive a request for content including a digital image;
program instructions to identify one or more contextually relevant portions of the digital image based on user context data;
program instructions to create boundaries that define the one or more contextually relevant portions of the digital image; and
program instructions to generate an altered versions of the digital image, wherein the altered version comprises the one or more contextually relevant portions at a higher resolution than the one or more remaining portions,
wherein the program instructions are stored on the computer readable storage medium for execution by the CPU via the computer readable memory.

15. The system of claim 14, wherein the user context data is context data of a user, the system further comprising program instructions to obtain user profile data including the user context data of the user.

16. The system of claim 15, wherein the request for content and the user profile data is received from a remote user device.

17. The system of claim 14, further comprising program instructions to load the altered version of the digital image for viewing by the user.

18. The system of claim 14, wherein obtaining user profile data includes obtaining personal context data and current context data.

19. The system of claim 18, wherein:
the personal context data comprises at least one selected from the group consisting of: user relationship data, user preference data, search input data, and current content displayed to a user; and
the current context data comprises at least one selected from the group consisting of: current location data, destination data, and computing device status data.

20. The system of claim 14, further comprising:
program instructions to receive a request to revise the altered version of the digital image;
program instructions to identify one or more contextually relevant portions of the altered digital image based on the request to revise the altered version of the digital image;
program instructions to create boundaries to define the one or more contextually relevant portions of the altered version of the digital image;

program instructions to rank the one or more contextually relevant portions and one or more remaining portions of the altered version of the digital image; and program instructions to generate a revised altered version of the digital image, wherein the revised altered version comprises the one or more contextually relevant portions at a higher resolution than the one or more remaining portions.

* * * * *